July 3, 1923.

H. NICHOLSON

REENFORCED PNEUMATIC TIRE CASING

Filed April 8, 1922

1,460,599

Witness:
John Enders

Inventor:
Herbert Nicholson,
by Robert Burns,
Atty

Patented July 3, 1923.

1,460,599

UNITED STATES PATENT OFFICE.

HERBERT NICHOLSON, OF CHICAGO, ILLINOIS.

REENFORCED PNEUMATIC-TIRE CASING.

Application filed April 8, 1922. Serial No. 550,614.

*To all whom it may concern:*

Be it known that I, HERBERT NICHOLSON, a citizen of the United States of America, residing at Chicago, in the county of Cook and State of Illinois, have invented a certain new and useful Improvement in Reenforced Pneumatic-Tire Casings, of which the following is a specification.

This invention relates to re-inforcing means for pneumatic tire casings intended to strengthen the same against blow-out occurrences and punctures, and has for its object:—

To provide a structural formation of the surfaces of the sheet reinforcing element whereby a strong and intimate bonding or joining of the same to the rubber component or element of the tire casing is attained with an avoidance of internal wear and local separation of such elements, and by means of which the utilization of sheets of vulcanized fiber can be made to afford the required tensile strength to resist ordinary blow-out stresses, with a thinness sufficient for ready flexure to not materially interfere with the necessary flexibility of the tire casing, all as will hereinafter more fully appear.

In the accompanying drawing:—

Like reference numerals indicate like parts in the several views.

The present improvement involves a superficial structural formation of strengthening or reinforcing sheets of vulcanized fiber, with the rubber constituent of a pneumatic tire casing, so that an intimate and substantial bonding of the meeting surfaces of the elements is attained with but slight decrease in the tensile strength of the reinforcing sheet, and which is adapted to resist the usual parting strains in actual use, with an avoidance of the rapid wear and deterioration within the tire casing that would ensue.

Extended investigation of the attempts of others to employ vulcanized fiber as a material for forming the reinforcing means for pneumatic tire casings, and extended experiment on the part of applicant has shown the use of vulcanized fiber would be of great value, could the surface adhesion between the same and the rubber constituent of the tire casing be effected and maintained during continued actual use of the tire casing. Extended experiments have shown that such surface adhesion cannot be attained during the ordinary vulcanizing operation to which tire casings are submitted during manufacture, even when the surfaces of the sheets of vulcanized fiber have been roughened by an attrition treatment with the sand blast, sand paper, etc., and that a more effective means is necessary to reach practical success. Such experiments have also shown that foraminous formation of the reinforcing sheet to attain effective bonding with the rubber constituent of the casing in which it is embedded, so weakens or reduces the tensile strength of the reinforcing sheet as to materially decrease its usefulness as a reinforcing means.

Figure 1:
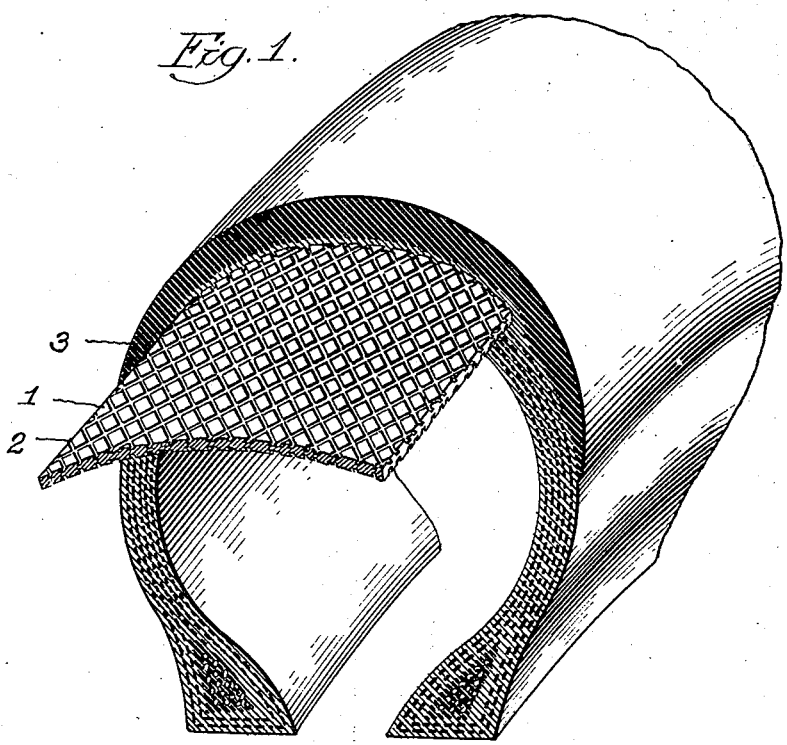
Fig. 1, is a fragmentary perspective view of a pneumatic tire casing illustrating the general arrangement and formation of parts in the present improvement.
Figure 2:
Fig. 2, is an enlarged detail section of a portion of the reinforcing sheet, showing one form of the improvement.

To such end the present improvement consists in the surface formation of the sheet of vulcanized fiber 1, used as a reinforce for pneumatic tire casings with a closely arranged series of shallow depressions or scores 2 as shown in Fig. 2, into which the rubber constituent portion 3 of the tire casing is adapted to enter and have a clinching engagement therein, to attain a substantial surface bonding or union of said elements, and capable of withstanding the usual strains in actual use without liability to parting under such strains.

Figure 3:
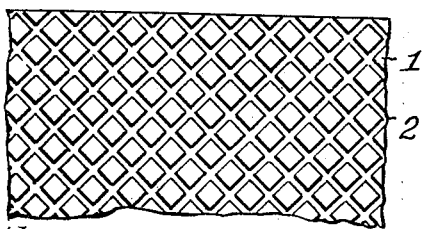
Fig. 3, is a plan view of the same.

In the preferred form of the present invention the inclined scores 2 are formed diagonally in respective faces of the reinforcing sheet 1 and with said scores crossing each other as shown in Fig. 3.

Having thus fully described my invention what I claim as new and desire to secure by Letters Patent, is:—

A reinforcing insert for pneumatic tire casings comprising, a sheet of vulcanized fiber formed on both faces with a series of closely arranged shallow depressions of an undercut form adapted to provide an effective bonding connection with the rubber constituent of the tire casing in which it is embedded.

Signed at Chicago, Illinois, this 6th day of April 1922.

HERBERT NICHOLSON.